(No Model.)
L. PRINCE.
STONE CUTTING MACHINE.
No. 469,091. Patented Feb. 16, 1892.
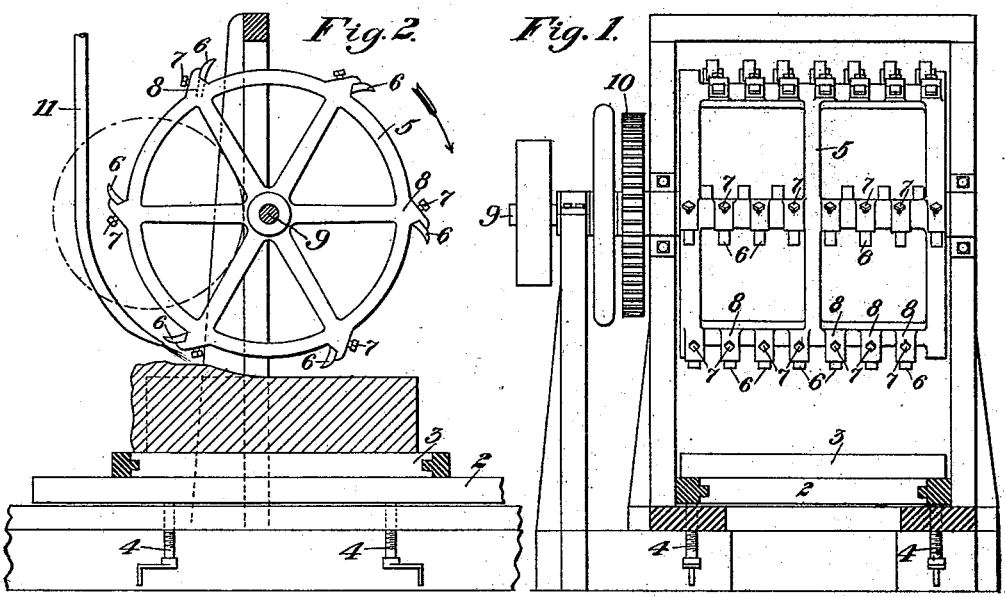
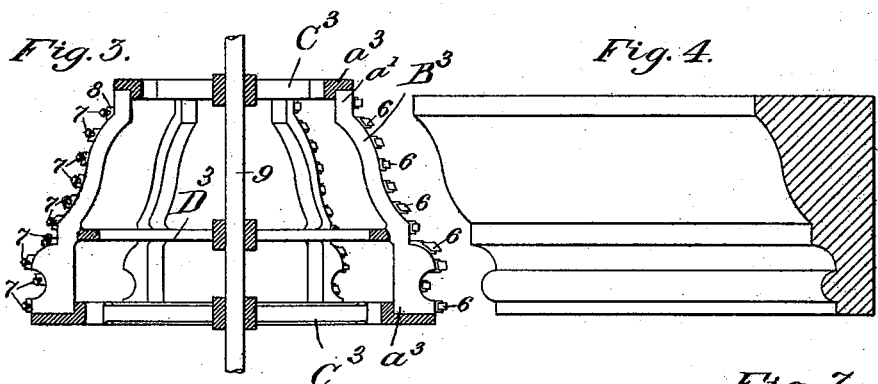
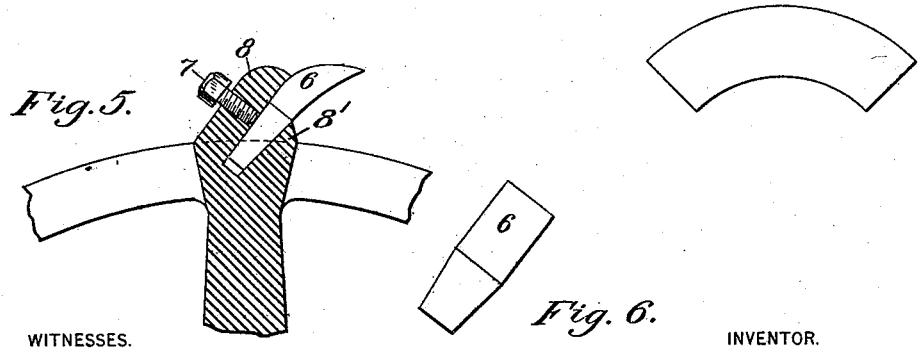
WITNESSES.
INVENTOR.

UNITED STATES PATENT OFFICE.

LOUIS PRINCE, OF WASHINGTON, DISTRICT OF COLUMBIA.

STONE-CUTTING MACHINE.

SPECIFICATION forming part of Letters Patent No. 469,091, dated February 16, 1892.

Application filed March 13, 1889. Renewed November 20, 1891. Serial No. 412,470. (No model.)

*To all whom it may concern:*

Be it known that I, LOUIS PRINCE, of Washington, in the District of Columbia, have invented a new and useful Improvement in Stone-Cutting Machines, of which the following is a full, clear, and exact description, reference being had to the accompanying drawings, forming part of this specification, in which—

Figure 1 is an end elevation of my improved machine. Fig. 2 is a side view thereof. Fig. 3 is a vertical axial section of a modified form of the cutter-drum. Fig. 4 is a perspective view of a block of stone cut thereby. Fig. 5 is a sectional view of one of the cutters and its holder. Fig. 6 is a plan view of the cutter. Fig. 7 is a side view of the block of stone of a form which may be cut by the machine.

Like symbols of reference indicate like parts in each.

In the drawings, 2 represents the carriage or traveling plate, which supports the stone to be cut, and which, by means not necessary to describe in detail, may be moved longitudinally on the machine, or, if desired, the stone may be stationary and the drum arranged to be movable lengthwise over it. The stone itself rests upon a clamp 3, which is movable transversely on the carrier 2 to shift the position of the stone laterally relatively to the cutters. The inclination of the stone may also be varied in a vertical plane by means of adjusting-screws 4, arranged as shown in Figs. 1 and 2. The cutting mechanism consists of a strong cylindrical drum 5, the periphery of which is provided with a series of cutters 6, each consisting of an iron or steel bit, the shank of which is preferably tapered and is inserted in a tapering socket in the frame, being confined therein by a set-screw 7. These cutters are preferably arranged in transverse parallel rows or series, the members of each row being braced in their sockets by ridges or reinforcements 8, which extend beyond the front projection 8', and the several series are so arranged relatively to each other that the members of each shall not be situate in uniform lines around the periphery of the drum, but shall be alternately spaced or arranged to "break-joint," so that all the corresponding cutters of the several series shall not follow each other in the same lines, but on different lines, and that a surface on the stone of the width of the drum shall be dressed or cut by its rotation. The drum is set on a rotatory shaft 9, and is driven by gearing 10 of a suitable nature. The sections $B^3$ are supported by end pieces $C^3$ $C^3$, which are recessed at $a'$ $a'$, and the sections $B^3$ are interchangeable, as will readily appear, and the form of section $B^3$ to be used may be put in and taken out at will.

The operation of the machine is as follows: The stone to be dressed is placed on the table 2, and by means of the screws 4 is lifted up to the cutter-drum. The drum may then be rotated in the direction of the arrow in Fig. 1, when, the cutters coming into contact with the stone, cut or dress its surface, as will be readily understood, and by reason of the fact that the cutters do not follow each other in lines, but are alternated in position, the whole surface width of the stone is cut evenly. By raising the stone with the adjusting-screws 4 it may be cut to any depth desired, and by moving it longitudinally beneath the cutters in the direction shown by the arrow $c$ the entire length or any part of the length of the stone may be subjected to the cutters.

During the operation of the machine water is supplied from a pipe 11 in front of the rotating cutter to prevent excessive heating of the cutters.

The surface outline imparted to the stone by the cutters depends upon the cross-sectional shape of the cutter-drum. Thus in the use of the drum shown in Fig. 1 a plane flat surface will be imparted to the stone, though by varying the angle of the stone to the cutter other forms, such as that shown in Fig. 7, may be produced. If it is desired to form stone for cornices or other purposes with an irregular surface outline, such as shown in Fig. 4, the drum should be made of corresponding shape, as shown in Fig. 3. By thus employing drums of various shapes different surface outlines may be produced on the stones. These drums may easily be removed from and replaced in the machine.

The advantages of my invention will be appreciated by those skilled in the art. The machine is simple in its construction and is very rapid and efficient in its action. By its use stone may be both cut and dressed evenly and with a great saving of cost as compared with the usual mode of hand-cutting.

I claim—

In a stone-cutting machine, the combination of a suitable supporting-frame and the skeleton drum consisting of the shaft 9, the end pieces $C^3$ and brace $B^3$, fastened thereto, and the removable sections $B^3$, having a series of spirally-arranged notches having reinforcements 8 larger than the projections 8', the cutters 6, and means for securing said cutters in place, substantially as shown and described.

In testimony whereof I have hereunto set my hand this 2d day of March, A. D. 1889.

LOUIS PRINCE.

Witnesses:
W. C. COFFIN, Jr.,
THOMAS W. BAKEWELL.